Patented June 22, 1943

2,322,486

UNITED STATES PATENT OFFICE 2,322,486

PROCESS OF CURING ZEIN

Lloyd C. Swallen, Villa Park, Ill., and Albert L. James, Tenafly, N. J., assignors to Corn Products Refining Company, New York, N. Y., a corporation of New Jersey No Drawing. Application August 3, 1940, Serial No. 351,090

16 Claims. (Cl. 260—123)

This invention relates to the production of zein or zein containing bodies of which the zein is cured with an aldehyde. The invention is applicable to zein films, coatings, fabrics impregnated with zein, laminated structures made up of zein impregnated sheets and molded zein articles.

The curing agent may be any reactive aldehyde such as formaldehyde and its derivatives paraformaldehyde and hexamethylenetetramine; or any substance liberating formaldehyde; also furfural, butyraldehyde and ethyl propyl acrolein.

The cure may be accomplished either by incorporating the aldehyde in a zein solution or zein dispersion, for example in an alcoholic solution of zein; or by immersing the formed zein article, the film, coating, impregnated article, molded body, or the like, in a bath containing the aldehyde.

The cure may be effected at room temperature or at elevated temperatures, preferably the latter in order to shorten the cure. Heating may be accompanied by pressure.

The zein bodies may contain plasticizers, such as any of the usual zein plasticizers such as dibutyl tartrate, fatty acids and glycol derivatives; and/or modifying agents such as the natural and synthetic resins.

The objects of the present invention are: (1) to reduce the curing time and counteract the possible inhibiting effect on the cure of the alcoholic solvent or of the plasticizing or modifying agents; (2) to increase the mechanical strength of the zein body; and (3) to increase the water resistance of the zein body.

These objects are accomplished, first, by employing in the cure acid sufficient in amount and strength to accelerate, as has been discovered, the cure of the zein by the aldehyde; whereby complete or substantially complete reaction between the zein and curing agent can be brought about at reduced time either at room temperature or by the application of heat. Without the accelerator the reaction at room temperature is very slow; and if hastened by application of high temperatures, the aldehyde is likely to be volatilized, in part at least, so as to impair the cure. The accelerator abbreviates the curing time at any temperature; and, furthermore, makes possible so rapid a reaction between zein and curing agent that high temperatures can be used, and shortening of the curing time effected, without loss of the aldehyde by volatilization. The acid also appears to counteract the inhibiting action of alcohol and some plasticizing and modifying agents on the zein-aldehyde reaction. The accelerator, therefore, acts to insure under all conditions complete cure, that is, complete reaction between the aldehyde and the zein.

Any acid of sufficient strength and used in sufficient amount will accelerate the cure. The matter appears to be one largely of pH. If the pH is low, the acceleration is increased. If the pH is high, relatively, there is less acceleration; but even small amounts of acid tend to produce an accelerating effect. However, the acidity of a zein aldehyde solution may be low enough, as in the patent to Oswald C. H. Sturken, No. 2,115,240, granted April 26, 1938, where the purpose of the acid was to inhibit denaturation (page 1, line 17) so that the curing effect of the acid will be negligible.

Acetic, lactic, citric, tartaric, salicylic, hydrochloric, phosphoric and sulfuric acids have all been found capable of accelerating the curing of zein with formaldehyde or other reactive aldehyde as a curing agent. However, for the production of some types of zein bodies strong mineral acids, such as sulfuric acid, are objectionable because they are non-volatile and leave too high an acidity in the zein body. Acids of this sort, theoretically capable of use as accelerators, are, therefore, objectionable, in some cases, for practical reasons. Preferably the acid used should (1) be of such nature that it will volatilize from the film or other body slowly after the cure has been accomplished; or (2) be of such nature as to be unobjectionable when remaining in the film; or (3) be used in a film the constituents of which are such as to result in the esterification of the acid.

The objects of the invention are also promoted, second, by the use (which, however, is optional) as secondary accelerators of ammonia or the primary amines, for example monomethylamine; that is, the use of substances having the formula $RNH_2$ in which R is either a hydrogen or an alkyl radical. These substances when used with the acid react to form corresponding salt and in that state act to further accelerate the reaction between the aldehyde and the zein. In place of using a mixture of the acid and ammonia or primary amine, resulting in the formation of a salt, the salt itself (e. g. ammonium chloride) may be used, without the acid when the salt is one of a strong acid, and in case of the salt of a weak acid with the addition of more acid. In any case a salt of the $RNH_2$ compound is present in the curing operation together with acid either added as such or developed from the salt.

The invention is illustrated in the following specific examples which, however, are to be regarded as typical and informative merely and not as imposing limitations upon the invention; the intention being to cover all equivalents and also all modifications within the scope of the hereto appended claims.

EXAMPLE 1.—*Acid cure—Coating solution.*—The solution in this case consisted of the following substances in proportions as follows:

| | | |
|---|---|---|
| Zein | grams | 30 |
| 40% formaldehyde | cc | 6 |
| 92% ethyl alcohol | cc | 90 |
| Dibutyl tartrate | cc | 8 |
| 50% lactic acid | cc | 3–12 |

The solution, not including the lactic acid, was divided into five parts, the first part was cured with no lactic acid and the other parts with 3 cc., 5 cc., 8 cc. and 12 cc., respectively, of lactic acid. Films made from the five solution mixtures were cured for three hours at 70° C. and for five days at room temperature with results indicated by the following table; the relative effectiveness of the cure being indicated by reduced water absorption.

Table I

| Sample No. | Amount 50% lactic acid | Water absorption cure 3 hours at 70° C. | Water absorption cure 5 days—room temperature |
|---|---|---|---|
| | Cc. | Per cent | Per cent |
| 1 | 0 | 110 | 125 |
| 2 | 3 | 17 | 66 |
| 3 | 5 | 15 | 39 |
| 4 | 8 | 17 | 47 |
| 5 | 12 | 18 | 25 |

EXAMPLE 2.—*Acid cure—Coating solution.*—In this experiment three grams of hexamethylenetetramine was used in place of formaldehyde. The results were as shown in the following table:

Table 2

| Sample No. | Amount 50% lactic acid | Water absorption cure 3 hours 70° C. | Water absorption cure 5 days—room temperature |
|---|---|---|---|
| | Cc. | Per cent | Per cent |
| 1 | 0 | 110 | 125 |
| 2 | 3 | 22 | 101 |
| 3 | 5 | 9 | 85 |
| 4 | 8 | 12 | 36 |
| 5 | 12 | 14 | 35 |

EXAMPLE 3.—*Acid-ammonia cure—Coating solution.*—The solution consisted of the following substances in quantities as follows:

| | | |
|---|---|---|
| Zein | grams | 30 |
| 40% formaldehyde | cc | 6 |
| 92% ethyl alcohol | cc | 90 |
| Dibutyl tartrate | cc | 8 |
| 50% lactic acid | cc | 12 |
| 25% ammonia | cc | 0.5–1.25 |

The solution, except for the ammonia, was divided into five parts and the first part cured with no ammonia; the second with 0.5 cc.; the third with 0.75 cc.; the fourth with 1.0 cc. and the fifth with 1.25 cc.

The results are given in the following table:

Table 3

| Sample No. | Amount 25% ammonia | Water absorption cure 3 hours 70° C. | Water absorption cure 5 days—room temperature |
|---|---|---|---|
| | Cc. | Per cent | Per cent |
| 1 | 0.00 | 18 | 25 to 36 |
| 2 | 0.5 | 15 | 15.5 |
| 3 | 0.75 | 12 | 17 |
| 4 | 1.0 | 11 | 21 |
| 5 | 1.25 | 15 | 24 |

EXAMPLE 4.—*Formaldehyde-acid—Bath cure.*—The following solutions were used as curing baths for already formed zein bodies giving the results as indicated:

(a) 30% formaldehyde _____ cc __ 85
    50% lactic acid _____ cc __ 15

Slight cure after two hours at room temperature.

(b) 30% formaldehyde _____ cc __ 95
    Glacial acetic acid _____ cc __ 5

Slight cure in 2 hours at room temperature.

(c) 40% formaldehyde _____ cc __ 92
    35% hydrochloric acid _____ cc __ 8

A good cure was obtained after 2 hours at room temperature, giving a transparent film.

(d) 40% formaldehyde _____ cc __ 98
    95% sulfuric acid _____ cc __ 2

A good cure was obtained in 2 hours at room temperature. The film was transparent.

(e) 40% formaldehyde _____ cc __ 98
    Phosphoric acid _____ cc __ 2

The film after 2 hours at room temperature was cured and tough, but white.

EXAMPLE 5.—*Bath cure—Acid and ammonia.*—The bath solution consisted of the following:

| | | |
|---|---|---|
| 40% formaldehyde | cc | 85 |
| 50% lactic acid | cc | 15 |
| 25% ammonia | cc | 0.2–6 |

Zein films were immersed for two hours in five solutions, the first containing no ammonia, and the others progressively increasing amounts of ammonia; and then removed and washed with water. These small amounts of ammonia were found to accelerate the cure very greatly. The results are given in the table below.

Table 4

| Sample No. | Amount ammonia | pH | Remarks |
|---|---|---|---|
| | Cc. | | |
| 1 | 0.0 | 2.1 | No cure. Dissolved zein off plate. |
| 2 | 0.2 | 2.27 | Slight cure. Turned white. |
| 3 | 0.5 | 2.5 | Fair cure. Transparent film. |
| 4 | 1.0 | 2.75 | Excellent cure. Transparent film, tough. |
| 5 | 3.0 | 3.1 | Do. |

EXAMPLE 6.—*Bath cure—Acid and ammonia.*—The following solutions gave strong transparent and water resistant films when used as curing baths with the immersion time 2 hours:

(f) 40% formaldehyde __ cubic centimeters __ 98
    35% hydrochloric acid _____ do ____ 2
    25% ammonia _____ do ____ 1

(g) 40% formaldehyde __ cubic centimeters __ 98
    95% sulfuric acid _____ do ____ 2
    25% ammonia _____ do ____ 1

EXAMPLE 7.—*Curing bath—Ammonium chloride.*—The bath consisted of 40% formaldehyde to which was added ammonium chloride in quantity of 0.5% by weight on the formaldehyde solution. Zein films immersed in this solution for two hours became tough, transparent and water resistant.

EXAMPLE 8.—*Coating compound — Ammonium chloride.*—The compound was made up as follows:

| | | |
|---|---|---|
| Zein | parts | 100 |
| 40% formaldehyde | do | 10 |
| Ammonium chloride | do | 2 |
| 90% ethyl alcohol | do | 500 |

Films and coatings made in accordance with this formula cured either by ageing at room temperature or by heating at 70° C. and were much more water resistant than similar films prepared without the addition of the ammonium chloride.

We claim:

1. In the process of curing zein with an aldehyde the improvement which consists in accelerating the reaction between the aldehyde and the zein by means of an acid and the salt of a substance having the formula $RNH_2$ in which the R is a member of the group consisting of hydrogen and the alkyl radicals.

2. In the process of curing zein with an aldehyde the improvement which consists in accelerating the reaction between the aldehyde and the zein by an acid and ammonia.

3. In the process of curing zein with formaldehyde the improvement which consists in accelerating the reaction between the formaldehyde and the zein by means of an acid and a small amount of ammonia.

4. Process of curing zein which comprises introducing into a zein solution an aldehyde and an acid to accelerate the reaction between the aldehyde and the zein together with a secondary accelerator consisting of a substance having the formula $RNH_2$ in which R is a member of the group consisting of hydrogen and the alkyl radicals.

5. Process of curing zein which comprises introducing into a zein solution an aldehyde and an acid to accelerate the reaction between the aldehyde and the zein in the presence of a secondary accelerator consisting of the salt of a substance having the formula $RNH_2$ in which R is a member of the group consisting of hydrogen and the alkyl radicals and heating the solution to evaporate the solvent and effect the cure.

6. Process of curing zein bodies which comprises immersing said bodies in a bath containing an aldehyde and an acid to accelerate the reaction between the aldehyde and the zein in the presence of a secondary accelerator consisting of the salt of a substance having the formula $RNH_2$ in which R is a member of the group consisting of hydrogen and the alkyl radicals.

7. Process of curing zein bodies which comprises immersing said bodies in a bath containing formaldehyde and an acid and ammonia to accelerate the reaction between the formaldehyde and the zein.

8. An alcoholic solution of zein containing an aldehyde and an acid in amount to accelerate the reaction between the aldehyde and the zein and increase the mechanical strength and water resistance of the cured zein.

9. An alcoholic solution of zein containing an aldehyde, an accelerating acid and the salt of a substance having the formula $RNH_2$ in which R is a member of the group consisting of hydrogen and the alkyl radicals.

10. Process of curing zein with an aldehyde which comprises reacting the zein and the aldehyde in the presence of a salt of a strong acid with a base of the formula $RNH_2$ in which R is a member of the group consisting of hydrogen and the alkyl radicals.

11. Process of curing zein with an aldehyde which comprises reacting the zein and the aldehyde in the presence of ammonium chloride.

12. Process of curing zein with formaldehyde which comprises reacting the zein and formaldehyde in the presence of a salt of a strong acid with a base of the formula $RNH_2$ in which R is a member of the group consisting of hydrogen and the alkyl radicals.

13. Process of curing zein with formaldehyde which comprises reacting the zein and the formaldehyde in the presence of ammonium chloride.

14. Process of curing zein with an aldehyde which comprises reacting the zein and the aldehyde in the presence of an acid and salt of the base $RNH_2$ in which R is a member of the group consisting of hydrogen and the alkyl radicals.

15. Process of curing zein with an aldehyde in the presence of an accelerator of the zein-aldehyde reaction of acidic character and comprising a basic substance of the formula $RNH_2$ in which R is a member of the group consisting of hydrogen and the alkyl radicals.

16. Process of producing a zein body of increased mechanical strength and water resistance which comprises: incorporating an aldehyde, as a curing agent, in a weakly acid, alcoholic solution of the zein which, however, contains sufficient acid to accelerate the curing action of the aldehyde on the zein; and then removing the alcoholic solvent from said solution so as to bring about the deposition of the zein body.

LLOYD C. SWALLEN.
ALBERT L. JAMES.